(12) United States Patent
Paragios et al.

(10) Patent No.: US 9,418,468 B2
(45) Date of Patent: Aug. 16, 2016

(54) METHOD AND DEVICE FOR ELASTIC REGISTRATION BETWEEN A TWO-DIMENSIONAL DIGITAL IMAGE AND A SLICE OF A THREE-DIMENSIONAL VOLUME WITH OVERLAPPING CONTENT

(71) Applicant: ECOLE CENTRALE PARIS

(72) Inventors: Nikos Paragios, Paris (FR); Enzo Ferrante, Paris (FR); Rafael Marini Silva, Paris (FR)

(73) Assignee: CENTRALESUPELEC, Gif sur Yvette (FR)

( * ) Notice: Subject to any disclaimer, the term of this patent is extended or adjusted under 35 U.S.C. 154(b) by 226 days.

(21) Appl. No.: 14/149,075

(22) Filed: Jan. 7, 2014

(65) Prior Publication Data

US 2014/0192046 A1  Jul. 10, 2014

Related U.S. Application Data

(60) Provisional application No. 61/749,503, filed on Jan. 7, 2013.

(51) Int. Cl.
*G06T 15/00* (2011.01)
*G06T 7/00* (2006.01)

(52) U.S. Cl.
CPC ............. *G06T 15/005* (2013.01); *G06T 7/0032* (2013.01); *G06T 7/0034* (2013.01); *G06T 2207/10072* (2013.01); *G06T 2207/20072* (2013.01); *G06T 2207/30004* (2013.01)

(58) Field of Classification Search
CPC ................... G06T 7/0093; G06T 2207/20016; G06T 2207/20072; G06T 7/0097; G06T 7/0089; G06T 3/0093; G06K 9/6297; G06K 9/4609; G06K 9/6206; G06K 2209/05
See application file for complete search history.

(56) References Cited

U.S. PATENT DOCUMENTS

2009/0046951 A1* 2/2009 Paragios ................. G06K 9/32
382/294
2009/0252416 A1* 10/2009 Komodakis .......... G06K 9/6297
382/180

OTHER PUBLICATIONS

International Search Report and Written Opinion in corresponding International Application No. PCT/EP2014/050160.
(Continued)

*Primary Examiner* — Haixia Du
(74) *Attorney, Agent, or Firm* — B. Aaron Schulman, Esq.; Stites & Harbison, PLLC

(57) ABSTRACT

A method and device for elastic registration of a two-dimensional source digital image of an object of interest with a slice of a three dimensional target volume of the object of interest is provided which defines a Markov Random Field framework having at least one undirected pairwise graph superimposed a two-dimensional image domain having at least a set of regular vertices and at least a set of edges, and defines a grid of control points, each control point corresponding to a vertex of the set of regular vertices, and a neighborhood system of edges associated with vertices. The method also defines a set of multi-dimensional labels of a discrete space to apply a displacement to each control point, the control point displacement defining a transformation adapted to obtain a plane slice of the target volume and an in-plane deformation transformation of the source digital image.

19 Claims, 8 Drawing Sheets

(56) References Cited

OTHER PUBLICATIONS

Zikic, et al., "Markov Random Field Optimization for Intensity-based 2D-3D Registration", Mar. 5, 2010, pp. 1-4, vol. 7623, XP55111092, Proceedings of Spie.

Kwon, et al., "Nonrigid Image Registration Using Higher-Order MRF Model with Dense Local Descriptor", Jan. 1, 2011, pp. 1-4, XP055111218, CVPR 2011 Workshop on Inference in Graphical Models with Structured Potentials.

Ferrante et al., "Non-rigid 2D-3D Medical Image Registration Using Markov Random Fields" 16th International Conference on Medical Image Computing and Computer Assisted Intervention—MICCAI 2013, Sep. 2013, Nagoya, Japan. Springer, 8151, pp. 163-170, 2013.

* cited by examiner

METHOD AND DEVICE FOR ELASTIC REGISTRATION BETWEEN A TWO-DIMENSIONAL DIGITAL IMAGE AND A SLICE OF A THREE-DIMENSIONAL VOLUME WITH OVERLAPPING CONTENT

The present invention concerns method for elastic registration between a two-dimensional digital image and a slice of a three-dimensional volume with overlapping content.

FIELD OF THE INVENTION

The field of the invention is the field of two-dimensional (2D) to three dimensional (3D) image registration/fusion either in the case of same modalities or different ones.

The 2D-3D images registration is an important problem in computer vision, and finds applications in multiple medical procedures, as radiotherapy planning and treatment verification, spinal surgery, hip replacement, neuro-interventions and aortic stenting.

BACKGROUND OF THE INVENTION

Image guided surgeries, laparoscopic or endoscopic, also benefit from the 2D-3D image registration where imaging acquisition devices are associated with the surgical devices Applicative fields of the invention include image guided adaptive radiotherapy planning and treatment, image-guided biopsy as breast under ultrasound guidance or prostate biopsies using MRI images and transrectal ultrasound (TRUS) achieve a higher detection of cancer. Another application domain is image-guided surgery, as laparoscopic or endoscopic, in particular neurosurgery which benefits from 2D-3D image fusion for evaluation of intracranial tumours and vascular pathologies.

In many medical imaging applications, it is particularly useful to achieve a registration/mapping between a two-dimensional image of a partial view of an object of interest that is captured during an operation, also called intra-operative capture, whereas a three-dimensional volume where the same object of interest is present partially or completely acquired at a pre-operative stage. It should be noted that the object of interest could exhibit shape changes during surgery (tissue shift, respiratory motion, cardiac heart beating). Such registration is useful to guide surgeons during operation through the mapping of visual observations at surgery to the 3D pre-operative high resolution annotated data.

A particular problem in medical applications is that tissue shift, as well as breathing and heart motion during surgery, cause elastic deformations of the organs and make the registration of a 2D image acquired during operation with a 3D volume previously computed a particularly challenging problem.

More generally, medical applications that can benefit from an elastic 2D to 3D registration, with possibly multi-modal acquired images, are application fields for the invention.

Several methods for achieving registrations between pre-operative 3D images and intra-operative 2D images are known, but they require either a learning stage or to pre-process input data. The quality of the final result is highly dependent on the learning stage.

Many known methods are either dedicated to specific organs (for example the ones requiring manual segmentation of the organ of interest that perform registration by segmentation) or could address the task for specific image modalities and therefore cannot be re-used in other applications.

An aim of the present invention is to provide a 2D-to-3D elastic/deformable registration/fusion method that overcomes the cited drawbacks.

To this end, the invention concerns, according to a first aspect, a method for elastic registration of a two-dimensional source digital image of an object of interest with a slice of a three dimensional target volume of the object of interest, the method comprising defining a Markov Random Field framework comprising at least one undirected pairwise graph superimposed on the two-dimensional image domain comprising at least a set of regular vertices and at least a set of edges, defining at least a grid of control points, each control point corresponding to a vertex of the set of vertices, and a neighborhood system of edges associated with vertices.

BRIEF SUMMARY OF THE INVENTION

The method of the invention comprises:
defining a set of multi-dimensional labels of a discrete space to associate to each control point, wherein a spatially displaced control point is obtained by assigning a given label to said control point, a control point displacement defining a transformation adapted to obtain a plane slice of the target volume and an in-plane deformation transformation of the source digital image,
obtaining a set of labels defining a set of displaced control points, by minimizing an energy target function, the set of displaced control points defining a plane slice of the target volume that elastically matches the two-dimensional source digital image according to the energy target function.

The energy target function being expressed as a sum of terms including at least one first order term computed as a sum, over the control points, of unary potentials depending on the vertex multi-dimensional label, and/or at least one second order term computed as a sum, over the pairs of control points according to a second order neighborhood system, of pairwise potentials depending on pairs of multi-dimensional labels of two connected vertices, and/or at least one higher order term, over higher order cliques of control points according to a higher order neighborhood system, of higher order potentials depending on a number of labels depending on the order of said cliques.

Advantageously, the invention provides an elastic registration method using Markov Random Fields that is able to determine simultaneously the plane and the in-plane dense deformation, which can be adapted to different image modalities.

According to an embodiment, each control point is assigned a five-dimensional label of a sampled discrete five-dimensional label space, each label comprising three parameters defining a displacement vector in a Cartesian coordinate system and two parameters defining a vector over a unit sphere, and wherein the in-plane deformation transformation of the source digital image and the plane transformation are determined simultaneously by said five-dimensional labels.

According to another embodiment, the undirected pairwise graph comprises two sets of vertices and three sets of edges, the two sets of vertices being regular and of same cardinality, a first set of vertices being labeled with labels from a first two-dimensional label space modeling in-plane deformations and a second set of vertices being labeled with labels from a second three-dimensional label space modeling the plane slice position, every control point having two associated vertices, a first vertex from the first set of vertices and a second vertex from the second set of vertices.

According to yet another embodiment, the undirected pairwise graph comprises a set of vertices, each vertex having an associated three dimensional label, and wherein two sets of edges are defined, a first set of edges composed of triplets of neighboring vertices of triangular shape, and a second set of edges composed of triplets of horizontal or vertical collinear neighboring vertices.

According to an embodiment, the obtaining of a set of displaced control points comprises a master-slave architecture:
  communicating to each slave a rigid transformation, each slave generating a plane slice from the target volume corresponding to said rigid transformation,
  obtaining an in-plane deformation transformation that minimizes a local energy criterion computed between the source image and the extracted plane slice, and
  memorizing an associated local energy term that minimizes the local energy.

According to a second aspect, the invention concerns a device for elastic registration of a two-dimensional source digital image of an object of interest with a slice of a three dimensional target volume of the object of interest, comprising a computing unit adapted to implement a method comprising defining a Markov Random Field framework comprising at least one undirected pairwise graph superimposed on the two-dimensional image domain comprising at least a set of regular vertices and at least a set of edges, defining at least a grid of control points, each control point corresponding to a vertex of the set of vertices, and a neighborhood system of edges associated with vertices.

The device comprises:
  a defining unit for defining a set of multi-dimensional labels of a discrete space to associate to each control point, wherein a spatially displaced control point is obtained by assigning a given label to said control point, a control point displacement defining a transformation adapted to obtain a plane slice of the target volume and an in-plane deformation transformation of the source digital image,
  an obtaining unit for obtaining a set of labels defining a set of displaced control points, by minimizing an energy target function, the set of displaced control points defining a plane slice of the target volume that elastically matches the two-dimensional source digital image according to the energy target function,
  the energy target function being expressed as a sum of terms including:
    at least one first order term computed as a sum, over the control points, of unary potentials depending on the vertex multi-dimensional label, and/or
    at least one second order term computed as a sum, over the pairs of control points according to a second order neighborhood system, of pairwise potentials depending on pairs of multi-dimensional labels of two connected vertices, and/or
    at least one higher order term, over higher order cliques of control points according to a higher order neighborhood system, of higher order potentials depending on a number of labels depending on the order of said cliques.

The advantages of the device of the invention are analogous to the advantages of the method of the invention briefly introduced above.

According to a third aspect, the invention concerns a non-transitory program storage device readable by a processing system, tangibly embodying a program of instructions executed by the processing system to perform the method steps for elastic registration of a two-dimensional source digital image of an object of interest with a slice of a three dimensional target volume of the object of interest as briefly described above.

The advantages of the non-transitory program storage device of the invention are analogous to the advantages of the method of the invention briefly introduced above.

BRIEF DESCRIPTION OF THE DRAWING FIGURES

The invention will be better understood in the light of the detailed description and accompanying drawings listed below, which are only exemplary and by no way limiting:

FIG. 1 is a flowchart of a first embodiment of a registration method according to the invention;

FIG. 2 schematically illustrates a 3D volume and a selected plane;

FIG. 3 represents a regular deformation grid of control points according to a second embodiment of the invention;

FIG. 4 schematically represents a registration transformation between a source image and a target slice;

FIG. 5 schematically represents a regular grid of control points and associated transform planes;

FIGS. 6 and 7 represent schematically sets of points of a discretized label space;

FIG. 8 schematically represents the principle of local patch extraction for similarity computation;

FIG. 9 schematically represents a regular grid of control points according to a third embodiment of the invention;

FIG. 10 schematically represents a transform plane according to the third embodiment of the invention;

DETAILED DESCRIPTION OF AN EXAMPLARY EMBODIMENTS

Figure 1:
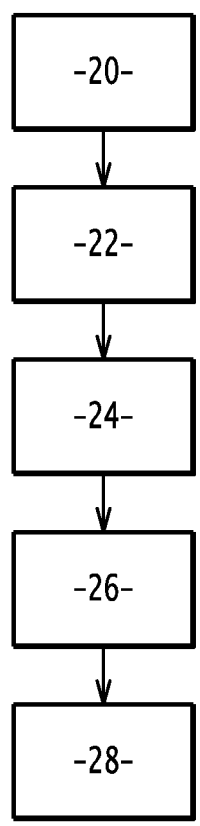

The invention is described in the context of medical imaging, wherein a two-dimensional (2D) image of a partial view of an object of interest is captured during an operational process, whereas a 3D volume of the same object of interest is computed in a pre-operational stage. For example, the 2D image is a Magnetic Resonance Image (MRI) or an Ultrasound image, whereas the 3D volume is obtained by computed tomography (CT) or MRI.

The invention method for elastic registration of a two-dimensional source digital image of an object of interest with a slice of a three dimensional target volume of the object of interest, the method comprising defining a Markov Random Field framework comprising an undirected pairwise graph superimposed on the two-dimensional image domain comprising at least a set of regular vertices and at least a set of edges, defining at least a grid of control points, each control point corresponding to a vertex of the set of vertices, and a neighborhood system of edges associated with vertices.

The invention solves an optimization problem, that can be generally defined by the following energy target function:

$$P(g, f) = a\sum_{p \in V} g_p(x_p) + b \sum_{(p_1, p_2) \in E1} f_{p_1, p_2}(x_{p1}, x_{p2}) + \quad (1)$$

$$c \sum_{C_i \in E2} f_{p_1 \ldots p_n}(x_{p_i 1}, \ldots, x_{p_i |C_i|})$$

Where V is the set of vertices defined, E1 is a second order neighborhood system associated to edges relating two vertices, E2 is a higher order neighborhood system associated to cliques $C_i$ of vertices of higher order, for example third order or more, and the number of edges in a clique $C_i$ is designated by $|C_i|$ The parameters a,b,c are real positive weights which are selected according to the embodiment of the invention, as explained in detail hereafter.

The potential functions $g_p(x_p)$ and $f_{p_1, p_2}(x_{p_1}, x_{p_2})$ and $f_{p_1 \ldots p_n}(x_{p_{i1}}, x_{p_i|C_i|})$ are defined over multi-dimensional labels $x_{p_i}$ associated with the control points $p_i$, as explained in detail hereafter.

In a general view, the energy target function comprises at least one first order term computed as a sum, over the control points, of unary potentials depending on the vertices labels, and/or at least one second order term computed as a sum, over the pairs of control points according to a given second order neighborhood system, of pairwise potentials depending on of the assigned labels of two connected vertices, and/or at least one higher order term, over higher order cliques of control points according to a higher order neighborhood system, of higher order potentials depending on a number of labels depending on the order of said cliques.

Several different embodiments of the invention will be described hereafter.

A deformation grid of the control points of regular grid G is defined using the coordinate transformation:

$$T(x) = x + \sum_{p \in G} \eta(|x - p|) d_p \quad (2)$$

Where x is a point in the source image, p is a position vector of a control point, $d_p$ is a displacement vector of control point p. A label $u_p$ is associated with each control point p and displacement $d_p$. The function $\eta(\ )$ is a weighting function for the displacement vector which determines the interpolation strategy.

According to a first embodiment of the invention, a plurality of rigid transformations $A_i$ defined in a three dimensional cartesian space by 6 coordinates $A_i=(t_x(i),t_y(i),t_z(i),r_x(i),r_y(i),r_z(i))$ where the first three parameters $t_x,t_y,t_z$ are parameters defining a translation and the following three $r_x,r_y,r_z$ are parameters defining a rotation, the following steps are implemented according the first embodiment of the invention.

An MRF (Markov Random Field) energy target function to be minimized by T is defined by the following terms:

$$E(u_p, A_i) = \frac{1}{|G|}\sum_{p \in G} V_p^t(u_p, A_i) + \frac{1}{|E|}\sum_{p,q \in E} V_{pq}^t(u_p, u_q, A_i) \quad (3)$$

Where E is a set of connected control points according to a neighborhood system, |G| is the number of points of G, |E| is the number of point of the neighborhood system and t is an iteration counter.

The first term of the energy function (3)

$$Term1 = \frac{1}{|G|}\sum_{p \in G} V_p^t(u_p, A_i)$$

is a first order term formed by unary potentials that encode data terms (similarity criterion), and the second term $$Term2 = \frac{1}{|E|}\sum_{p,q \in G} V_{pq}^t(u_p, u_q, A_i)$$

is a second order regularization term, containing binary potentials that are used to impose smoothness on the deformation field.

It should be noted that in present embodiment arbitrary similarity metric can be used to compare the source and the target image, which is a slice plane of the target volume, as well as arbitrary smoothness constraints imposing different degrees of smoothness on the deformation field.

Advantageously, the registration method casts the MRF optimization problem to a linear programming one and uses the fast primal-dual algorithm to determine a coordinate transformation for in-plane deformation that minimizes the energy function as defined above. In order to take advantage of modern parallel architectures, the global transformation problem is decoupled from the local deformation and the considered optimization problem is solved through parallel creation of multiple instances of the global transformation and the optimization of the associated energy corresponding to the local transformation.

The subsequent steps run in parallel through a master-slave architecture. The master maintains two variables, one that corresponds to the minimal energy $E_{min}$ initially set to infinity and one that corresponds to the optimal transformation, initially set to the identity transformation. The master in a first step 20 generates m-possible planes $A_i=(t_x(i),t_y(i),t_z(i),r_x(i),r_y(i),r_z(i))$.

Each plane is communicated (step 22) to one of the slaves, or multiple planes are communicated to the same slave.

Each slave, for each plane or slice $J_i$ according to transformation $A_i$ is extracted from the target volume J.

A 2D-2D registration using Markov Random Fields between the source image I and the target image $J_i$ is applied in step 24. In this step, a regular deformation grid of control points is defined on the source image I, providing a sparse representation of a deformation field. The regular grid is deformed under the influence of image similarity criteria and regularization constraints to obtain an in-plane deformation of the source image I in order to get the best match with the target image $J_i$.

In a preferred embodiment, the method applied for the 2D-2D registrations is the method described in U.S. Pat. No. 8,126,291 B2, the contents of which are herein incorporated by reference in their entirety.

An MRF energy target function to be minimized by in-plane transformation T is defined by the following terms:

$$E = \frac{1}{|G|}\sum_{p \in G} V_p^t(u_p) + \frac{1}{|E|}\sum_{p,q \in E} V_{pq}^t(u_p, u_q) \quad (4)$$

Where E is a set of connected control points according to a neighborhood system, |G| is the number of points of G, |E| is the number of point of the neighborhood system and t is an iteration counter.

The first term of the energy function (4)

$$Term1 = \frac{1}{|G|} \sum_{p \in G} V_p^t(u_p)$$

is formed by unary potentials that encode data terms (similarity criterion), and the second term $$Term2 = \frac{1}{|E|} \sum_{p,q \in G} V_{pq}^t(u_p, u_q)$$

is a regularization term, containing binary potentials that are used to impose smoothness on the deformation field.

It should be noted that in present embodiment arbitrary similarity metric can be used to compare the source and the target image as well as arbitrary smoothness constraints imposing different degrees of smoothness on the deformation field.

The registration step 24 provides an energy term $E_i$ associated to the transformation. This energy is communicated to the master (step 26) that compares it with the existing minimum energy (step 28). If the energy is lower than the existing minimum energy then the minimum $E_{min}$ is set to $E_i$ and the optimal transformation to the one corresponding to the minimum energy.

In this embodiment, each control point can be considered as having an associated label $l_p$ composed of the label $u_p$ previously defined for the energy minimization in order to obtain the in-plane transformation and a plane index i designating the plane transformation among the plurality of plane transformations considered. The overall process allows determining the label $l_p$ for each control point for selecting the in-plane and the rigid plane transformation minimizing a global energy criterion defined by the energy target function.

Preferably, m is comprised between 100 and 10000.

Advantageously, the method is parallelizable both in CPU and GPU, the steps 24 and 26 being naturally carried out in parallel.

Therefore, the first embodiment of the invention has the advantage of computational efficiency.

According to a second embodiment of the invention, a direct elastic 2D-3D registration is applied, based on Markov Random Fields.

Given a 2D source image I and a 3D target volume J, the objective is to determine a 2D-2D in-plane local deformation $\hat{T}_D$ and a bi-dimensional slice of the volume J, defined by a plane $\hat{\pi}(J)$, which minimize the following objective function, also called I energy target function:

$$E = M((I \cdot T_D(x), \pi[J](x)) + R(T_D, \pi) \quad (5)$$

Therefore, the in-plane deformation and the plane transformation to be found are defined as:

$$\hat{T}_D, \hat{\pi} = \underset{T_D, \pi}{\arg\min} M((I \circ T_D(x), \pi[J](x)) + R(T_D, \pi) \quad (6)$$

where x represents the pixels of the source image I, M is the data term and R is the regularization term.

The data term M measures the matching quality between the in-plane deformed 2D source image and the slice $\pi[J]$ of the 3D volume J. The regularization term R imposes certain constraints on the final solution, that can be used to render the problem well posed primarily acting on the geometric properties of the deformation field.

The plane $\hat{\pi}[J]$ that minimizes the equation (6) indicates the slice of the 3D volume J that is more similar to the deformed source image. The deformation field $\hat{T}_D$ represents the in-plane transformation that minimizes the objective function. Such a plane/deformation can be represented in various ways. One can consider 3D displacements of three points (that define a plane but require at least three points) or adopt an over-parameterized model that associates a plane normal and a plane displacement at each control point endowed with additional geometrical constraints to impose consistency on the plane selection and the in-plane deformation.

Figure 2:
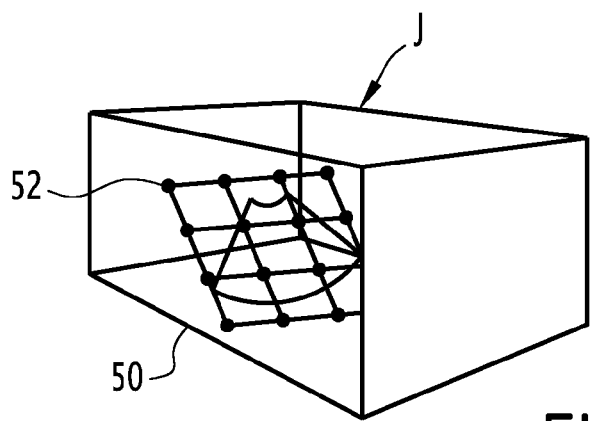

In the second embodiment of the invention, an undirected pairwise graph $G = \langle V, E \rangle$ is super-imposed image in the 2D domain, with a set of vertices V and a set of cliques or edges E, as schematically shown in FIG. 2.

The vertices V, forming a regular lattice, are interpreted as control points of a bi-dimensional quasi-planar grid that models at the same time the in-plane deformation and the current position of the 2D image in the 3D volume, therefore the position of the slice of the 3D volume matching the source image I.

FIG. 2 schematically illustrates a 3D volume J and a grid 50 composed of regular vertices 52. A deformation grid of the control points is defined as:

$$T(x) = x + \sum_{p \in G} \eta(|x - p|) d_p \quad (7)$$

where x is a point in the source image, p is a position vector of a control point, $d_p$ is a displacement vector of control point p. A label $u_p$ is associated with each control point p and displacement $d_p$. The function $\eta(\ )$ is a weighting function for the displacement vector which determines the interpolation strategy.

The grid represents a Free Form Deformation (FFD) model where each control point has only local influence on the underlying image deformation.

Figure 3:
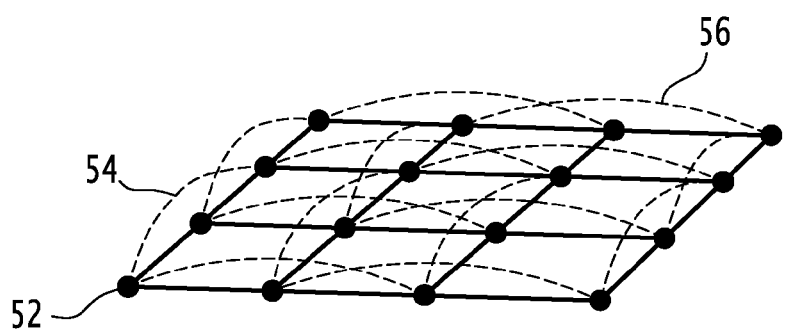

The set of edges E is formed, in this embodiment, by a regular grid of 4-neighbor connections as illustrated schematically on FIG. 3. According to a chosen pairwise neighborhood system, each vertex of the grid is connected to 4 neighbors, the connections being represented by lines 54 in FIG. 3. Moreover, some extra edges 56 between non-direct neighbors are introduced to improve the geometrical constraints propagation. The extra edges between non-direct neighbors are controlled using parameter $\omega \in [0,1]$ which indicates a distance between vertices linked by the extra edges 56. In the example of FIG. 3, the parameter $\omega$ is set to $\omega=0,5$, connecting therefore vertices that have a distance of 2 in the horizontal and vertical direction.

The vertices of the set V move by assigning them different labels $u_i$ of a label space L until an optimal position according to a given criterion is found.

Preferably, the criterion is the minimization of an energy target term, therefore the optimal position in the label space is the position that minimizes the energy target term defined.

Figure 4:
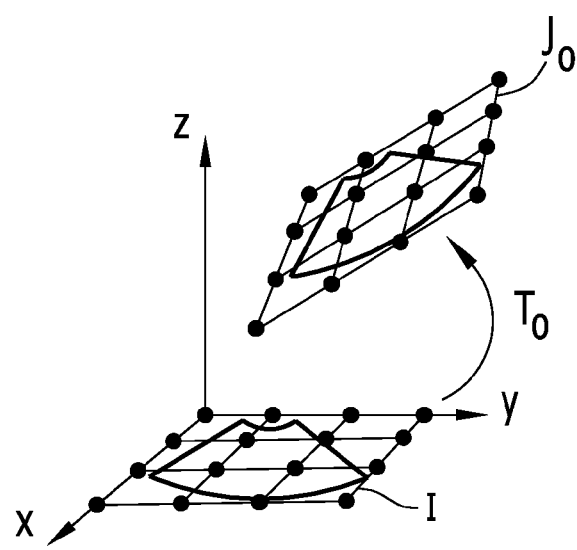

FIG. 4 illustrates a three dimensional Cartesian coordinate system with source image I and a slice plane $J_0$ extracted from the 3D volume J by applying an initial rigid transformation $\pi_0$.

In order to deform the pairwise graph G, the label space L including all possible values that a vertex may take, is first defined.

Preferably, in this second embodiment, the label space L consists of 5-tuples u with the following structure:

$$u=(d_x,d_y,d_z,\phi,\theta) \quad (8)$$

where the first three parameters ($d_x,d_y,d_z$) define a displacement vector $d_i$ in the Cartesian coordinate system illustrated in FIG. 4, and the angles ($\phi,\theta$) a vector $N_i$ over a unit sphere, the angles ($\phi,\theta$) being the spherical coordinates of the vector $N_i$.

Given a control point $p_i=(p_{xi},p_{yi},p_{zi})$ defining the initial position of a vertex and assigning label $u_i=(d_{xi},d_{yi},d_{zi},\phi_i,\theta_i)$ to this control point, a displaced control point $p'_i$ defining a position of vertex in the target volume is obtained:

$$p'_i=(p_{xi}+d_{xi},p_{yi}+d_{yi},p_{zi}+d_{zi}) \quad (9)$$

Figure 5:
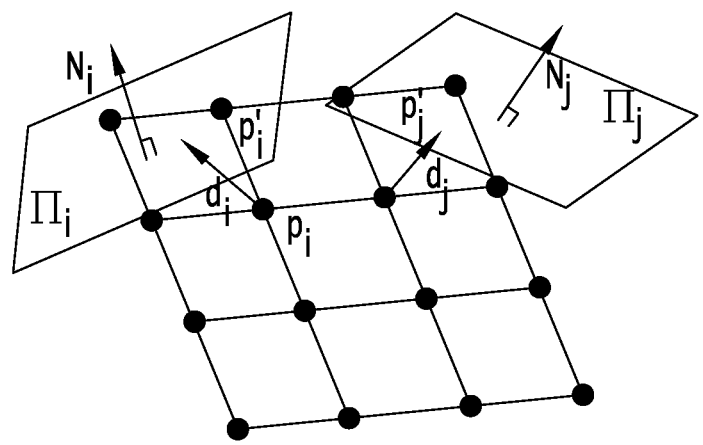

Additionally, a plane $\pi_i$ containing the displaced control point $p'_i$ and whose unit normal vector is $N_i$ of coordinates ($\phi_i,\theta_i$) is obtained, as schematically illustrated in FIG. 5.

In FIG. 5, two control points $p_i$ and $p_j$ are illustrated, along with associated displacement vectors $d_i$ and $d_j$, corresponding displaced control points $p'_i$ and, $p'_j$, associated vectors $N_i$ and $N_j$, each defining a respective plane $\pi_i$ and $\pi_j$.

Figure 6:
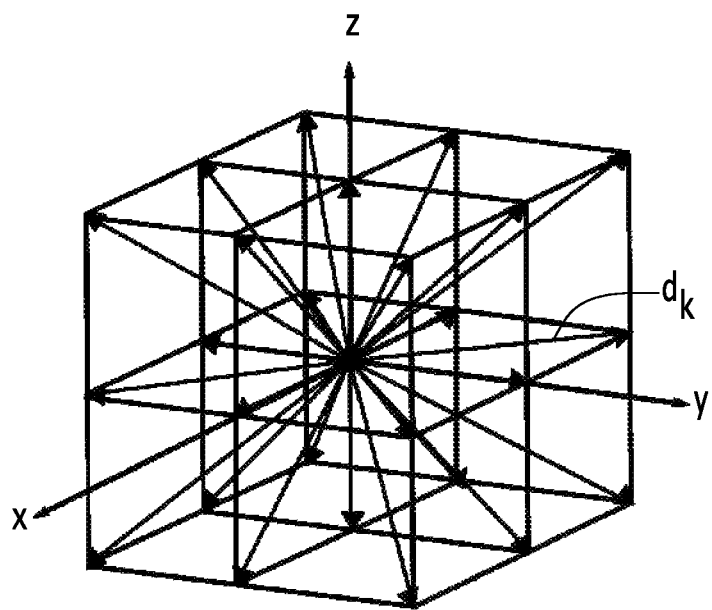
Figure 7:
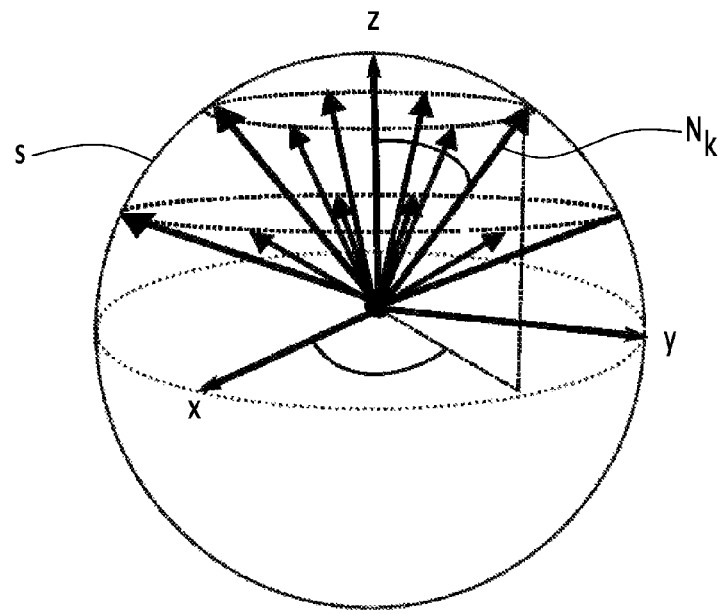

FIG. 6 illustrates a set of displacement vectors $d_i$ and FIG. 7 illustrates a set of vectors $N_k$ over a unit sphere S that constitute an example of sampled label space L.

The MRF energy target function to be optimized is formed as a summation of a first order data term and a second order regularization term.

In this second embodiment, the data term is formed by unary potentials $g=\{g_i(\ )\}$, each vertex having an associate unary potential $g_i$, and the regularization terms is function of pairwise potentials $f=\{f_i(\ )\}$ associated with the edges of graph G.

The unary potentials are typically used for encoding the similarity score between the deformed plane and the target volume, whereas the pairwise potentials act as regularizers and play an important role in obtaining consistent geometrically and high quality results.

The minimization energy problem in the context of discrete MRF is defined as:

$$MRF(g,f) = \min \sum_{i \in V} g_i(u_i) + \sum_{(i,j)} f_{ij}(u_i,u_j) \quad (10)$$

Where $u_i,u_j \in L$ are the labels associated to the vertices $v_i,v_j \in V$

Advantageously, the formulation of the unary potential is independent on a similarity measure implemented. Therefore, any intensity based metric $\delta$ capable of measuring the distance between two images may be applied, for example a sum of absolute differences, mutual information, normalized cross correlation resulting on a modular with respect to the image modalities to be registered approach.

The unary potentials are calculated for each control point $p_i$, using its associated plane $\pi_i[J]$ of the target 3D volume J and the source image I.

In a preferred embodiment, a patch $\Omega_i$, centered in $p_i$, of plane $\pi_i[J]$, is extracted from the 3D target volume J, so that a metric $\delta$ can be calculated between the intensity values of the patch $\Omega_i$ and the corresponding area of the source image. If pixel-wise comparisons are considered in the metric then the similarity criterion can be expressed by the following formula:

$$g_i(u_i) = \int_{\Omega_i} \delta(I(x), \pi_i[J](x))dx \quad (11)$$

Where x designates the spatial coordinates of pixels belonging to patch $\Omega_i$.

It should be noted that the patch orientation is determined in such a way that it is consistent with the one of the corresponding patch in the source image I.

Figure 8:
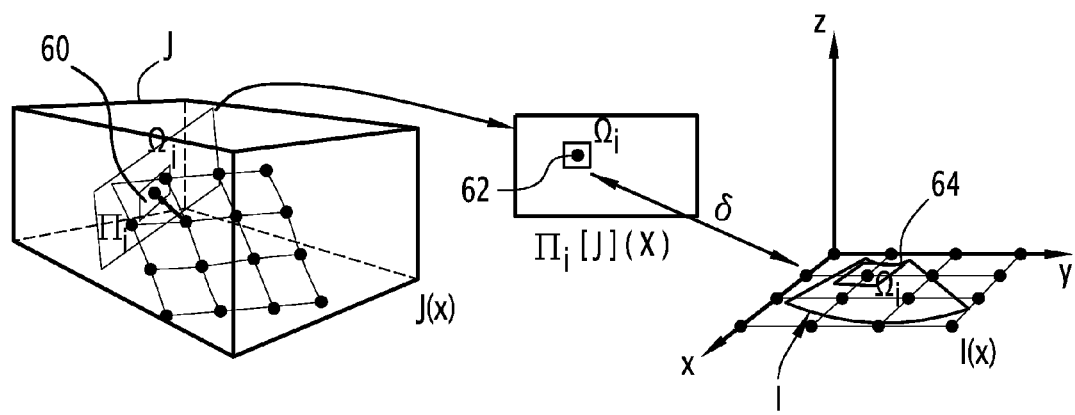

FIG. 8 illustrates schematically a patch $\Omega_i$, referenced in the 3D target volume J, of plane $\pi_i[J]$, the associated extracted patch 62, and the corresponding patch 64 of the source image I.

The patch $\Omega_i$ is preferably of regular geometric shape, for example a square area centered on control point $p_i$. Patches corresponding to adjacent control points can either overlap or not overlap depending on the degree of smoothness that is expected with respect to the estimated transformation. Overlapping patches will tend to smooth further the deformation compared to the non-overlapping ones.

In an embodiment, particularly adapted in the case where two images of the same modality are compared, the metric $\delta$ is the sum of absolute differences:

$$g_{SAD,i}(u_i) = \int_{\Omega_i} |I(x) - \pi_i[J](x)|dx \quad (12)$$

In multimodal scenarios, where different modalities are compared, for example CT and ultrasound images, statistical similarity measures such as Mutual Information (MI) are preferably used. Indeed, in these scenarios, the corresponding objects do not have the same intensities in two images.

Mutual information is defined using joint intensity distribution P(i,j) and the marginal intensity distribution P(i) and P(j) of the images. These local distributions are determined empirically using the observed samples at the source image and the target patch:

$$g_{MI,i}(u_i) = -\int_{\Omega_i} \log \frac{P(I(x), \pi_i[J](x))}{P(I(x))P(\pi_i[J](x))}dx \quad (13)$$

More generally, the framework described can be generalized using any similarity measure defined over two bi-dimensional images.

The regularization terms, also called pairwise potentials as mentioned above, encode the regularization of the displacement field.

In a preferred variant of this second embodiment, the pairwise potentials are defined by two terms, the first regularization term $F_1$ controlling the grid deformation assuming that the grid is a plane, the second regularization term $F_2$ maintaining a plane structure of the grid after applying displacements to the control points.

The first and second terms are weighted by a coefficient $\alpha$ as indicated by the following equation:

$$f_{ij}(u_i,u_j) = \alpha F_1(u_i,u_j) + (1-\alpha)F_2(u_i,u_j) \quad (14)$$

The in-plane grid deformation is controlled using a distance preserving approach, so as to preserve the original distance between the control points of the grid, which are assumed to be co-planar.

Preferably, the distance metric is an Euclidean distance between control points, designed by $\|\ \|$.

For example, the first term $F_1$ that regularizes the in-plane deformation is given by:

$$F_1(u_i, u_j) = \left|1 - \frac{\|(p_i + d_i) - (p_j + d_j)\|}{\|p_{0,i} - p_{0,j}\|}\right| \quad (15)$$

Where $p_{0,i}$ and $P_{0,j}$ are the original positions of the control points in the source image I. The distance between the original positions of the control points is dependent on the considered grid resolution, and varies from one level to the next in a multiresolution approach as explained in detail hereafter.

The second regularization term $F_2$ penalizes the average distance between a control points and the plane corresponding to a neighboring control point. The aim is to maintain a quasi-planar structure of the grid.

Given that the distance between a point and a plane is zero when the point is in the plane, the second regularization term $F_2$ is minimum when both control points are in the same plane.

The distance between a point $p=(p_x,p_y,p_z)$ and a plane $\pi$ defined by normal vector $N=(n_x,n_y,n_z)$ and point $q=(q_x,q_y,q_z)$ is calculated as:

$$D_\pi(p) = \frac{|n_x(p_x - q_x) + n_y(p_y - q_y) + n_z(p_z - q_z)|}{\sqrt{n_x^2 + n_y^2 + n_z^2}} \quad (16)$$

The second regularization term $F_2$, that is symmetric, is then defined by the average of $D_{\pi j}(p_i+d_i)$ and $D_{\pi i}(p_j+d_j)$:

$$F_2(u_i,u_j) = \tfrac{1}{2}(D_{\pi j}(p_i+d_i) + D_{\pi i}(p_j+d_j)) \quad (17)$$

The normal vectors in the label space are expressed using spherical coordinates with a fixed ratio $r=1$. The following representation equivalence applies between Cartesian coordinates $(n_x, n_y, n_z)$ and spherical coordinates $(r,\phi,\theta)$:

$$n_x = r\sin(\theta)\cos(\phi), n_y = r\sin(\theta)\sin(\phi), n_z = r\cos(\theta) \quad (18)$$

Preferably, the method called FAST-PD, described in the U.S. Pat. No. 8,131,069, included herein by reference, is used for determining the optimal labels according to the energy target function of formula indicated by equation (10) above.

In an implementation of this second embodiment, in order to reduce the computational time to convergence, a pyramidal approach is applied. In this approach, several grid resolution levels are used, from a coarse to a fine spacing between control points. For each grid resolution, a fixed number of iterations of the registration algorithm are performed, choosing the optimal five dimensional label for each control point of each grid resolution level and updating the control points position with this information from one grid resolution level to the next one.

For each resolution level, during the iterations over one grid resolution, the size of the displacement vectors and angles that form the label space is reduced so as to improve the search space sampling. The transformation obtained after several optimization steps at a given resolution level is used to initialize the position of a finer regular grid at the next level.

For example, from one resolution grid to the next finer one, the grid size multiplied by 2 by introducing a new control point at equidistance from two adjacent ones.

Preferably, the number of grid resolution levels varies between 3 to 5.

Preferably, the maximum displacement of a control point is restricted to a fraction of the grid spacing, for example to 0.4 times the grid spacing. Advantageously, this constraint guarantees a diffeomorphic deformation field.

According to a third embodiment of the invention, the label space is decoupled in order to decrease the computational cost. The graph-structure is decoupled in two different (identical) ones, the first acting on the in plane deformation and the second acting on the plane selection. Advantageously, such a decoupling allows considering big displacements and small deformations in the search space.

In this third embodiment, every vertex of the previous embodiment is decoupled in two different connected vertices, one of them modeling the in-plane deformation and the other one the position of the plane slice in the target volume J. This is analogous on creating two separated graphs of the same size and topology with different types of vertices, taking values in two different label spaces, one for the in-plane deformation and another one for the plane position, which can be sampled with different precisions.

According to this embodiment, two identical graphs are defined and connected by a pairwise edge for all corresponding vertices, having associated pairwise potentials in order to encode the matching similarity measure.

Figure 9:
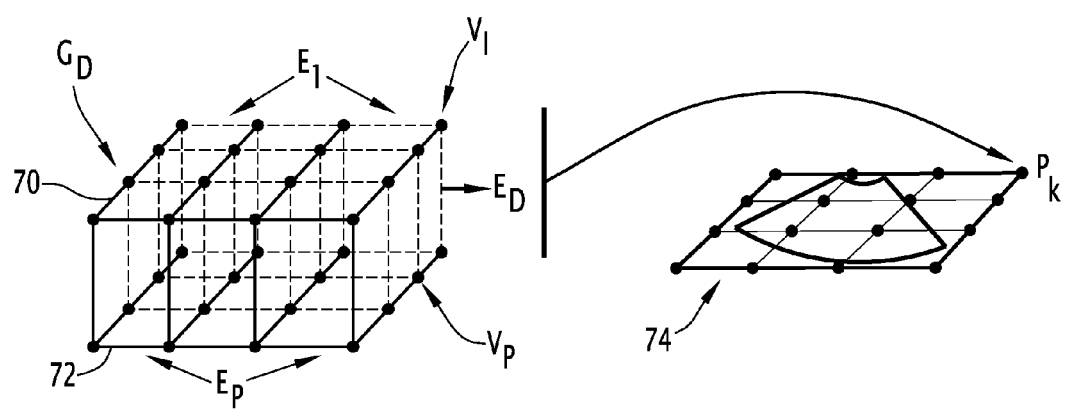

As shown in FIG. 9, an undirected pairwise graph $G_D = \langle V, E \rangle$ composed of two sets of vertices $V = V_I \cup V_P$ and three sets of edges $E = E_I \cup E_P \cup E_D$.

The vertices $V_I$ and $V_P$ form respective regular lattices noted 70 and 72 in FIG. 9, each having the same cardinality and a four-neighbor structure. The vertices in $V_I$ are labeled with labels that model in-plane deformation, while vertices in $V_P$ model the plane position. The respective edges in $E_I$ and $E_P$ correspond to classical grid connections for vertices in $V_I$ and $V_P$ respectively, and are associated with regularization terms. Edges in $E_D$ link every vertex from $V_I$ to a corresponding vertex from $V_P$, as shown in FIG. 9.

This modeling is equivalent to a single grid modeling, as already described with respect to the second embodiment of the invention, every control point $p_k$ of the grid 74 having two associated vertices, $v_k^I \in V_I$ and $v_k^P \in V_P$.

Two label spaces are defined, a first label space $L_I$ associated with the vertices in $V_I$ and a second label space $L_P$ associated with the vertices in $V_P$.

The first label space $L_I$ is a bi-dimensional space that models in-plane deformation using displacement vectors $l^I=(d_x, d_y)$.

Figure 10:
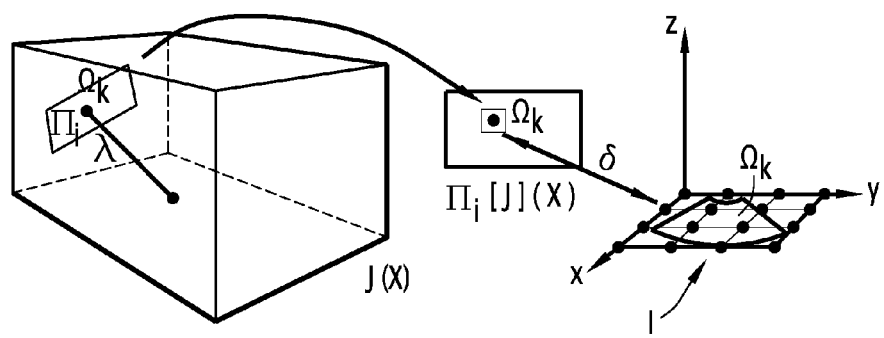

The second label space $L_P$ is tridimensional and indicates the plane in which the corresponding control point is located, comprising labels $l^P=(\phi,\theta,\lambda)$ where $\phi$ and $\theta$ are angles defining a vector N over a unit sphere, expressed using spherical coordinates while $\lambda$ corresponds to the displacement applied to the control point p along the normal to the plane defined using the $(\phi,\theta)$ unit sphere plane parameterization. Together with parameter $\lambda$ they define the position of the plane associated with a given control point, as shown in FIG. 10.

Considering the analogy with the second embodiment, every control point $p_k$ is associated with two vertices $v_k^I \in V_I$ and $v_k^P \in V_P$ and their respective labels, $l_k^I \in L_I$ and $l_k^P \in L_P$. A plane $\pi_k$ with normal vector N contains the displaced control point $p_k+l_k^I$. The parameter $\lambda$ indicates the magnitude of the translation applied to the plane $\pi_k$ in the direction given by vector N in order to place the plane in its final position, as schematically shown in FIG. 10.

The energy target that guides the optimization process is defined over the pairwise terms as follows:

$$MRF_D(I, P, D) = \min\left(\sum_{(i,j)\in E_I} e_{i,j}^I(l_i^I, l_j^I) + \sum_{(i,j)\in E_P} e_{i,j}^P(l_i^P, l_j^P) + \sum_{(i,j)\in E_D} e_{i,j}^D(l_i^I, l_j^P)\right) \quad (19)$$

Where $e_{i,j}^I$ acts as an in-plane regularizer, associated with edges in $E_I$, $e_{i,j}^P$ acts as plane regularizer, associated with edges in $E_P$, and $e_{i,j}^D$ are data terms associated with edges in $E_D$, $l_i^I$ and $l_i^P$ are labels respectively from the first label space $L_I$ and the second label space $L_P$.

The data term is defined for every control point $p_k$ using the information provided by the two associated graph vertices, and is encoded in pairwise terms $e_{i,j}^D$.

As proposed in the second embodiment, in a preferred implementation, a patch $\Omega_k$ of the plane $\pi_k$ centered on the displaced control point defined by label $l_i^I$ and normal to the vector defined by the label $l_i^P$ is extracted from the 3D volume J, and a similarity measure $\delta$ is calculated between the image signal of the patch $\Omega_k$ and the corresponding area over the source image I, as schematically shown in FIG. 10.

$$e_{i,j}^D(l_i^I, l_j^P) = \int_{\Omega_k} \delta(I(x), \pi_k[J](x))dx \quad (20)$$

In an embodiment, particularly adapted in the case where two images of the same modality are compared, the metric $\delta$ is the sum of absolute differences.

Alternatively, in multimodal scenarios, the similarity measure could be any information theoretic measure like for example Mutual Information.

Two regularization terms, similar to the ones defined in the second embodiment, are defined.

The first regularization term controls the in-plane deformation and is defined between vertices included in $V_I$.

In a distance preserving approach, the first regularization term is defined as:

$$e_{i,j}^I(l_i^I, l_j^P) = \left|1 - \frac{\|(p_i + l_i^I) - (p_j + l_j^I)\|}{\|p_{0,i} - p_{0,j}\|}\right| \quad (21)$$

Where $p_{o,i}$ and $p_{o,j}$ are the original positions of the control points.

The second regularization term penalizes the distance between the control points and the plane corresponding to the neighboring ones.

The distance between a point $p=(p_x,p_y,p_z)$ and a plane $\pi$ defined by normal vector $N=(n_x,n_y,n_z)$ and point $q=(q_x,q_y,q_z)$ is calculated as:

$$D_\pi(p) = \frac{|n_x(p_x - q_x) + n_y(p_y - q_y) + n_z(p_z - q_z)|}{\sqrt{n_x^2 + n_y^2 + n_z^2}} \quad (22)$$

The second regularization term is then defined as:

$$e_{i,j}^P(l_i^P, l_j^P) = \frac{1}{2}(D_{\pi_j}(p'_i) + D_{\pi_i}(p'_j)) \quad (23)$$

Where $p'_i$ and $p'_j$ are the positions after applying label $l_i^P$ to $p_i$ and label $l_j^P$ to $p_j$ respectively.

Preferably, the method called FAST-PD, described in the U.S. Pat. No. 8,131,069 is used for determining the optimal labels according to the energy formula above.

In an implementation of this second embodiment, in order to reduce the computational time to convergence, a pyramidal approach is applied. In this approach, several grid resolution levels are used, from a coarse to a fine spacing between control points. For each grid resolution, a fixed number of iterations of the registration algorithm are performed, choosing the optimal five dimensional label for each control point of each grid resolution level and updating the control points position with this information from one grid resolution level to the next one.

For each resolution level, during the iterations over one grid resolution, the size of the displacement vectors and angles that form the label space is reduced so as to improve the search space sampling. The transformation obtained after several optimization steps at a given resolution level is used to initialize the position of a finer regular grid at the next level.

For example, from one resolution grid to the next finer one, the grid step multiplied by 2 by introducing a new control point at equidistance from two adjacent ones.

Preferably, the number of grid resolution levels varies between 3 to 5.

Preferably, the maximum displacement of a control point is restricted to a fraction of the grid spacing, for example to 0.4 times the grid spacing. Advantageously, this constraint guarantees a diffeomorphic deformation field.

According to a fourth embodiment, more accurate and more complex energy terms are formulated using higher order neighborhood systems or cliques. The advantage of such an approach is that it provides a framework for exact and precise estimation of the in-plane and out-plane transformation using a low dimensional label space (translations in the 3 dominant directions) and a graph structure of a small number of nodes.

In this fourth embodiment, a new formulation of the 2D-3D non-rigid registration problem consists of an undirected graph $G_H = \langle V, E \rangle$ super-imposed on the 2D image domain with a set of vertices V and a set of cliques $E = E_D \cup E_R$. The vertices are interpreted as control points of a bi-dimensional quasi-planar grid that models at the same time the in-plane deformations and the current position of the 2D image into the 3D volume for obtaining a plane slice of the target volume. In order to represent the in-plane deformations, the grid is interpreted as a Free Form Deformation (FFD) where each control point has only a local influence on the deformation.

Vertices V are labeled with three dimensional vectors $l_i$ belonging to a label three dimensional label space $L_H$, indicating the position of the control point in a 3D Cartesian coordinate system.

Figure 11:
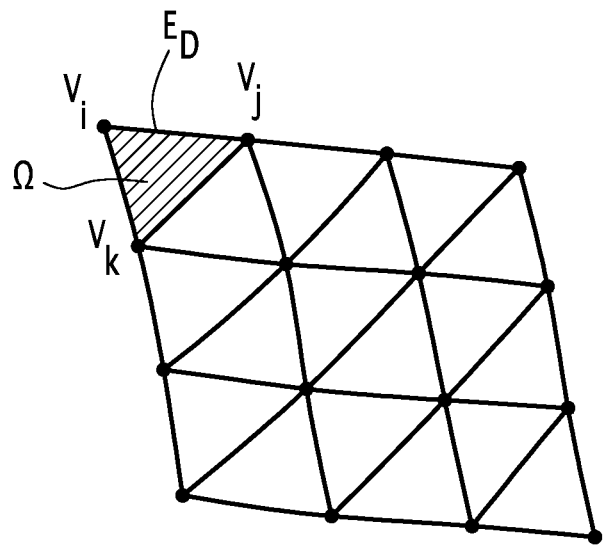
FIGS. 11 and 12 represent schematically third order cliques according to a fourth embodiment of the invention.
Figure 12:
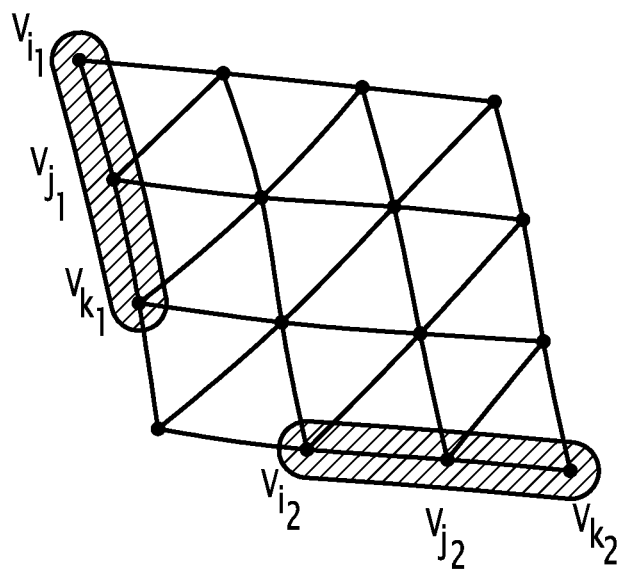

Two types of cliques are defined, as schematically illustrated in FIGS. 11 and 12.

The cliques in $E_D$ are triplets of neighboring vertices $\{V_i, V_j, V_k\}$ of triangular shape, as illustrated in FIG. 11, associated with data terms.

Advantageously, using third-order triangular cliques for data terms allows the estimation of the exact position of the plane slice, without explicit transformation.

The cliques in $E_R$ are horizontal or vertical collinear third-order cliques, as schematically shown in FIG. 12. The cliques in $E_R$ are associated with regularization terms.

Advantageously, using triplets of collinear points for regularization allows the encoding a smoothness prior based on the discrete approximation of the second-order derivatives using only the vertices position.

The control points, corresponding to vertices of the grid, are displaced by assigning them different labels until an optimal position is found, according to an optimality criterion defined by a high order energy target function.

Preferably, a simple three-dimensional labeling space $L_H$, sampled as shown in FIG. 6, is defined.

The energy target function to be minimized is expressed as:

$$MRF_H(D, R) = \min\left(\sum_{(i,j,k)\in E_D} D_{ijk}(l_i, l_j, l_k) + \beta \sum_{(i,j,k)\in E_R} R_{ijk}(l_i, l_j, l_k)\right) \quad (24)$$

Where data terms $D_{ijk}$ are associated with triangular triplets $(i,j,k)\in E_D$, regularization terms $R_{ijk}$ are associated with collinear horizontal and vertical triplets $(i,j,k)\in E_R$, $l_i$ is a label associated to a displacement vector $(d_x,d_y,d_z)$ assigned to vertex i, and $\beta$ is a parameter weighting the contribution of the data and regularization terms.

The data terms $D_{ijk}$ are defined over a triangular cliques $d=(i,j,k)$ using the source image I and the corresponding plane $\pi_d(J)$ extracted from the target volume J defined by the control points of the clique. The formulation of the data term is independent of the similarity measure $\delta$. The data term associated with clique d is defined as:

$$D_{ijk}(l_i, l_j, l_k) = \int_{\Omega_k} \delta(I(x), \pi_d[J](x)) dx \quad (25)$$

where $x\in\Omega_d$, $\Omega_d$ corresponds to the triangular area defined by the control points of clique d over the plane $\pi_d(J)$, after applying the labels $(l_i,l_j,l_k)$ to the vertices.

In an embodiment, particularly adapted in the case where two images of the same modality are compared, the metric $\delta$ is the sum of absolute differences.

Alternatively, in multimodal scenarios, information theoretical measures like for example Mutual Information can be used.

More generally, the data term being defined independently of the similarity measure, any appropriate similarity measure can be chosen according to the application envisaged.

The regularization terms $R_{ijk}$ impose the planar and regular structure of the grid.

A regularization term $R_{ijk}$ is defined for every clique of three collinear vertices, in horizontal and vertical directions. Further, extra collinear cliques are defined for vertices that are collinear but not contiguous, in order to propagate the regularization so that the planar structure is conserved. The regularization term is formed of two parts, a first one that insures the plane structure of the grid and a second one that regularizes the in-plane deformations.

Planar consistency is enforced through a discrete approximation of the second-order derivatives of the grid.

Given three contiguous control points $(p_i,p_j,p_k)$ and their corresponding labels $(l_i, l_j, l_k)$, the following first part term of the regularization term is defined:

$$R^A_{ijk}(l_i, l_j, l_k) = \frac{\|(p_i + l_i) + (p_k + l_k) - 2 \times (p_j + l_j)\|^2}{\Delta^2} \quad (26)$$

Where $\|\ \|$ represents the Euclidean norm and $\Delta$ is the distance between the control points $(p_i, p_j, p_k)$ of the clique.

In order to achieve in-plane deformation smoothness, a distance preserving approach is applied.

The ratio $\psi_{ij}$ of the Euclidean distance between the displaced control points $p_i+l_i$ and $p_j+l_j$ and the original distance between their initial positions $p_{o,i}$ and $p_{o,j}$ is defined as:

$$\psi_{ij} = \frac{\|(p_i + l_i) - (p_j + l_j)\|}{\|p_{o,i} - p_{o,j}\|} \quad (27)$$

The term $\Psi_{ij}$ is defined so as to be symmetric with respect to the displacement of the points and to penalize with the same cost when displaced control points are closer or more distant, that is to say it is not dependent on the direction of displacement:

$$\Psi_{ij}=(1-\psi_{ij})^2+(1-\psi_{ij}^{-1})^2 \quad (28)$$

For a given clique $d=(i, j, k)$, the following second part term of the regularization term is defined:

$$R^B_{ijk}(l_i, l_j, l_k) = \frac{\Psi_{ij} + \Psi_{jk}}{2} \quad (29)$$

Finally, the regularization term is preferably defined as:

$$R_{ijk}(l_i,l_j,l_k)=(1-\gamma)R^A_{ijk}(l_i,l_j,l_k)+\gamma R^B_{ijk}(l_i,l_j,l_k) \quad (30)$$

where $\gamma$ is a weighting factor, comprised between 0 and 1, used to calibrate the regularization term.

The objective function defined in formula (24) proposed in this fourth embodiment is to be optimized, e.g. minimized.

According to a first variant, a mapping to a factor graph is used for optimization.

A factor graph, as known in information theory, is a bipartite graph that factorizes a given energy target function, expressing which variables are arguments of which local functions.

In this implementation, a bipartite graph $G_H'=\langle V',F',E'\rangle$ is defined, where V' is the set of variable vertices formed by the vertices of $G_H$, F' is the set of all the factors $f\in F$, where every factor $f$ is associated to one clique from the high order graph $G_H$, and the set $E'\subset V'\times F'$ defines the relation between the vertices and the factors.

The previous three-dimensional label space is used for labeling graph vertices.

Every factor $f$ has an associated function $\phi_f:V'^3\rightarrow\Re$ that can correspond to a data or regularization term from equations (25), (26), (29) respectively.

The energy target function of the discrete labeling problem in the context of factor graphs is given by:

$$\varepsilon(x) = \sum_{f\in F'} \varphi_f(v_i, v_j, v_k) \quad (31)$$

Where x corresponds to a given labeling of the graph $G'_H$ and $v_i$, $v_j$, $v_k$ are the variables in the neighborhood of factor $f$.

Figure 13:
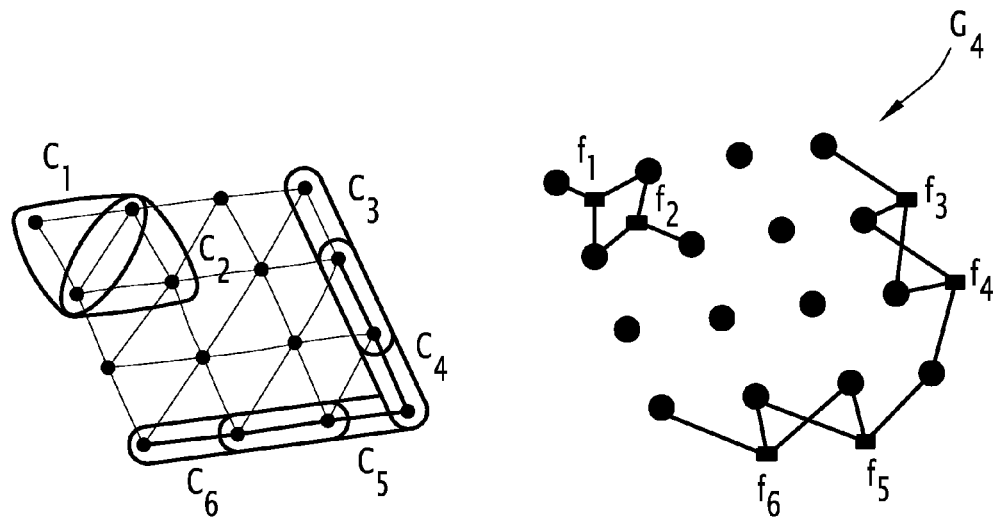
FIG. 13 illustrates a correspondence between cliques and a factor graph according to an embodiment of the invention.

FIG. 13 illustrates an example of a set of cliques $c_1$ to $c_6$ and associated factors $f_1$ to $f_6$ of a factor graph.

The optimal labeling $\hat{\epsilon}$ is the labeling with associated minimal energy:

$$\hat{x} = \underset{x}{\operatorname{argmin}}(\varepsilon(x)) \quad (32)$$

Different algorithms can be used to optimize this model.

In this embodiment, dual decomposition based methods may be applied. Dual decomposition consists in decomposition the graph into smaller trees that are sub-problems simpler to optimize, and combining the solutions found for the sub-problems to find a final labeling of the graph.

Each of the sub-problems is called a slave. The task of combining the solutions is performed by a master, handling conflicting suggestions from slaves that assign different labels to shared vertices. The master applies n iterative processes based on projected subgradient method, which encourages slaves to agree on a common label for shared vertices. The slaves are selected so as to cover at least once every vertex and edge of the initial graph.

MRF optimization based on dual decomposition is known in the art, and has in particular been described in the article "MRF Energy minimization and beyond via dual decomposition", by N. Komodakis et al, published in IEEE Transactions on Pattern Analysis and Machine Intelligence, pages 531-552, 2011.

In this alternative embodiment, two types of slaves are proposed, depending whether they are associated with cliques in $E_D$ (data term) or cliques in $E_H$ (regularization term).

Figure 14:
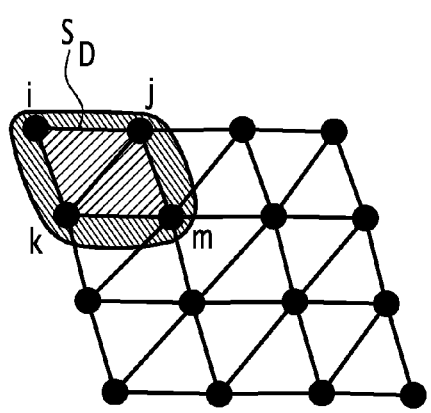
FIGS. 14 and 15 represent schematically groupings of cliques according to an embodiment of the invention.

In an exemplary embodiment illustrated in FIG. 14, a slave $S_D$ is associated with a couple of triangular cliques that forms a square. In this case, the size of the slaves is always of four vertices, and therefore they can be optimized using a simple brute force approach which gives systematically an optimal solution. In the example, $S_D=\{(i,j,k),(j,k,m)\}$.

Figure 15:
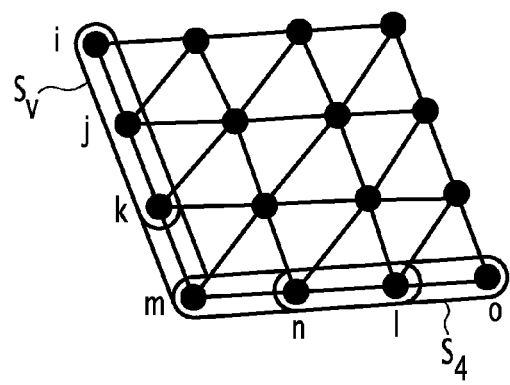

FIG. 15 schematically illustrates slaves associated with regularization terms. One slave is associated with each row and one with each column, including all cliques that belong to the corresponding row or column. In the example of FIG. 15, the slave associated with the column is $S_V=\{(i,j,k),(j,k,m)\}$, while the slave associated with the line is $S_H=\{(m,n,l),(n,l,o)\}$. Advantageously, these slaves present a chain structure, and therefore a Belief Propagation algorithm gives optimal results in linear time with respect to the number of vertices in chained graphs.

As in the previous embodiments, advantageously, in a practical implementation, in order to further improve the computational time, a pyramidal approach is applied. In this approach, several grid resolution levels are used, from a coarse to a fine spacing between control points.

Preferably, the maximum displacement of a control point is restricted to a fraction of the grid spacing, for example to 0.4 times the grid spacing. Advantageously, this constraint guarantees a diffeomorphic deformation field.

In a general view, the registration method of the invention, as exemplified by the embodiments described above comprises:

computing a first data term of an energy target function, based on unary potential values associated to each control point, and using values of at least part of the source image and a corresponding area of a plane slice extracted from the target volume, computing at least one second regularization term of the energy target function taking into account interactions between at least two neighboring vertices of the graph according to the neighborhood system, selecting a control point displacement associated to each control point, a control point displacement defining a transformation adapted to obtain a plane slice of the target volume and an in-plane deformation transformation of the source digital image, said control point displacement being representative of the in-plane deformation transformation of the source digital image and the plane transformation that minimize a global energy criterion, formed by summation of the first data term and the at least one second data term, so as to obtain a plane slice of the target volume that elastically matches the two-dimensional source digital image according to the global energy criterion.

It is to be understood that embodiments of the present invention can be implemented in various forms of programmable hardware, software, firmware, special purpose processes, or a combination thereof.

In one embodiment, the present invention can be implemented in software as an application program tangible embodied on a computer readable program storage device. The application program can be uploaded to, and executed by, a machine comprising any suitable architecture.

In another embodiment, the present invention can be implemented in a hardware associated with a processing unit (scanner, ultrasound acquisition device, graphics processing units, FPGAs, etc.)

Figure 16:
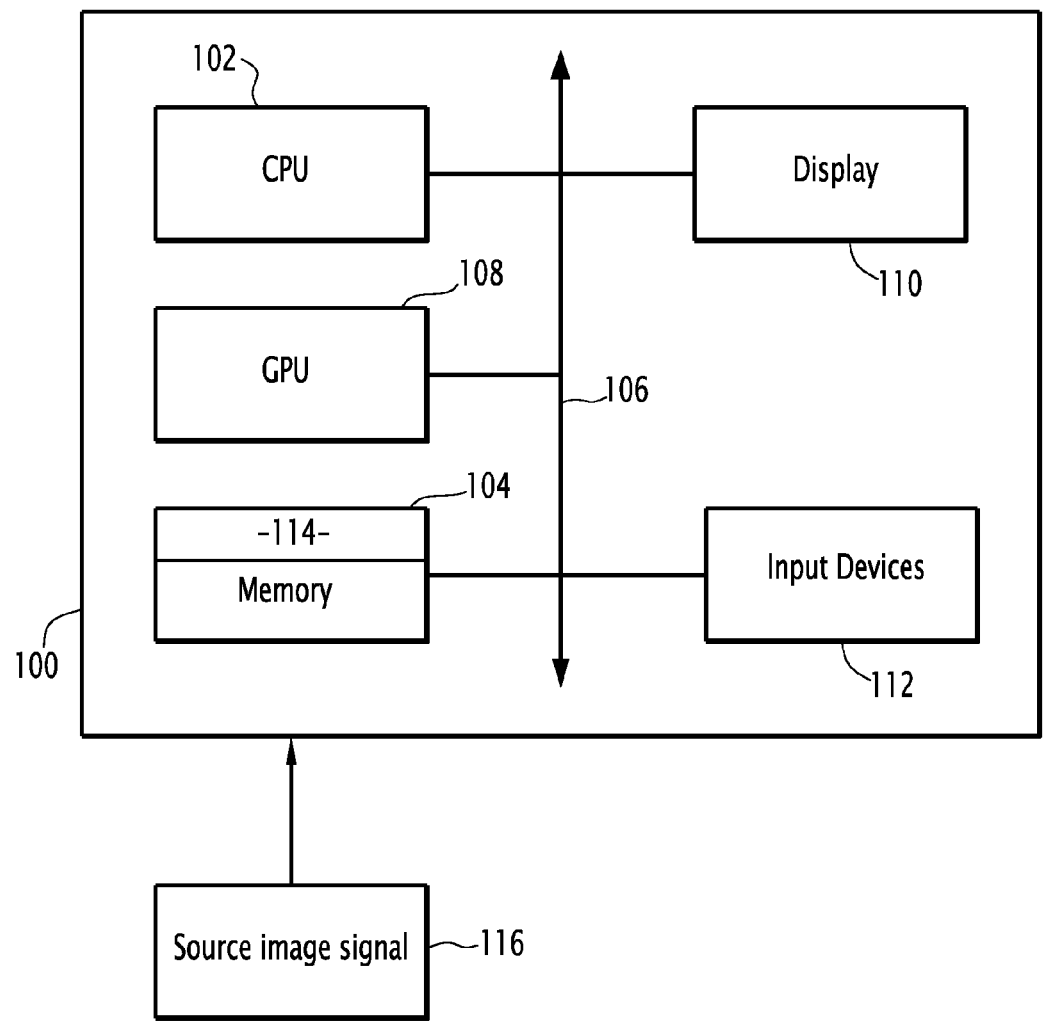
FIG. 16 is a block diagram of an exemplary computer system for elastic registration according to the invention.

FIG. 16 is a block diagram of an exemplary processing system for implementing a method elastic registration of a two-dimensional source digital image of an object of interest with a slice of a three dimensional target volume of the object of interest, according to an embodiment of the invention.

Referring now to FIG. 16, a processing system 100 for implementing the present invention comprises, a central processing unit (CPU) 102, a memory 104, an input/output (I/O) interface 106 and a graphics processing unit 108. The processing system 100 is generally coupled through the I/O interface 106 to a display 110 and various input devices 112 such as a mouse, keyboard touch-pad screen and devices (running on different operating systems IOS, Android), gesture interpretation devices (kinect, range data).

The support circuits can include circuits such as cache, power supplies, clock circuits, and a communication bus. The memory 104 can include random access memory (RAM), read only memory (ROM), remote access hardware drive (conventional hard drive or cloud storage) accessible through direct connection, wired wireless ethernet or a combination thereof. The present invention can be implemented as a routine 114 that is stored in memory 104 and executed by the CPU 102 or by GPU 108 to process the signal from the source image 116. As such, the computer system 100 is a general purpose computer system that becomes a specific purpose processing system when executing the routine 114 of the present invention.

The processing system 100 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

In a variant, a routine 114 that is stored in memory 104 and executed by the CPU 102 or by GPU 108 to process the signal from the source image 116 is part of a medical processing programmed device, for example an echography device.

It is to be further understood that, because some of the constituent system components and method steps depicted in the accompanying figures can be implemented in software, the actual connections between the systems components (or the process steps) may differ depending upon the manner in which the present invention is programmed.

Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

The invention claimed is:

1. A method for elastic registration of a two-dimensional source digital image of an object of interest with a slice of a three dimensional target volume of the object of interest, the method comprising defining a Markov Random Field framework comprising at least one undirected pairwise graph superimposed on a two-dimensional image domain comprising at least a set of regular vertices and at least a set of edges, defining at least a grid of control points, each control point corresponding to a vertex of the set of vertices, and a neighborhood system of edges associated with vertices, wherein said method further comprises:
defining a set of multi-dimensional labels of a discrete space to associate to each control point, wherein a spatially displaced control point is obtained by assigning a given label of the multi-dimensional labels to said control points, a control point displacement defining a transformation adapted to obtain a plane slice of the target volume and an in-plane deformation transformation of the source digital image, obtaining a further set of labels defining a set of displaced control points, by minimizing an energy target function, the set of displaced control points defining a plane slice of the target volume that elastically matches the two-dimensional source digital image according to the energy function, the energy target function being expressed as a sum of terms comprising:
at least one first order term computed as a sum, over the control points, of unary potentials depending on the multi-dimensional labels,
at least one second order term computed as a sum, over pairs of control points according to a second order neighborhood system, of pairwise potentials depending on pairs of multi-dimensional labels of two connected vertices, and
at least one higher order term, over higher order cliques of control points according to a higher order neighborhood system, of higher order potentials depending on a number of the multi-dimensional labels depending on the order of said cliques, and obtaining said elastic registration.

2. The method according to claim 1, wherein each control point is assigned a five-dimensional label of a sampled discrete five-dimensional label space, each label comprising three parameters defining a displacement vector in a Cartesian coordinate system and two parameters defining a vector over a unit sphere, and wherein the in-plane deformation transformation of the source digital image and the plane transformation are determined simultaneously by said five-dimensional labels.

3. The method according to claim 2, comprising selecting, for each control point, a five-dimensional label of the sampled discrete label space that minimizes an energy target function expressed as a sum of a first order term called data term and a second order term called regularization term.

4. The method according to claim 3, wherein the data term is, for a given control point, representative of a similarity according to a predetermined similarity metric over a patch centered on said control point, between the intensity values of the source image and the corresponding intensity values of the plane slice extracted from the target volume of a corresponding patch.

5. The method according to claim 4, wherein the regularization term is formed as a weighted sum of a first regularization term controlling grid deformation and a second regularization term maintaining a plane structure of the grid after applying displacements to control points.

6. The method according to claim 2, wherein several resolution levels are defined for the grid of control points, and wherein, for a current grid resolution level, a five-dimensional label defining a displacement of a control point is obtained for each control point, a subsequent grid resolution level is obtained increasing the grid resolution and the five-dimensional labels obtained at the first grid resolution level are used as starting control points positions at the subsequent grid resolution level.

7. The method according to claim 1, wherein said undirected pairwise graph comprises two sets of vertices and three sets of edges, the two sets of vertices being regular and of same cardinality, a first set of vertices being labeled with labels from a first two-dimensional label space modeling in-plane deformations and a second set of vertices being labeled with labels from a second three-dimensional label space modeling the plane slice position, every control point having two associated vertices, a first vertex from the first set of vertices and a second vertex from the second set of vertices.

8. The method according to claim 7, wherein a first set of edges defines connections in the first set of vertices, a second set of edges defines connections in the second set of vertices and a third set of edges links every vertex of the first set of vertices to a corresponding vertex of the second set of vertices.

9. The method according to claim 7, wherein the first label space is two-dimensional, each label defining an in-plane deformation transformation, and the second label space is three-dimensional, each second label comprising two angle values and a distance parameter, the two angle values defining a vector over a unit sphere and the distance parameter representing the distance between a control point and a plane slice normal to said vector.

10. The method of claim 9, wherein the energy target function is computed as a sum of three second order terms comprising a first data term associated with edges of the third set of edges, a second regularization term associated with edges of the first set of edges and a third regularization term associated with edges of the second set of edges, wherein the second regularization term controls in-plane deformation using first labels defining displacement of vertices of the first set of vertices and the third regularization term maintains a plane structure of the grid after applying displacements to control points using second labels associated to vertices of the second set of vertices.

11. The method according to claim 7, wherein several resolution levels are defined for the grid of control points, and wherein the global energy criterion is optimized for control points of each grid resolution level to obtain optimal labels for each control of both sets of vertices said resolution level.

12. The method according to claim 1, wherein said undirected pairwise graph comprises a set of vertices, each vertex having an associated three dimensional label, and wherein two sets of edges are defined, a first set of edges composed of triplets of neighboring vertices of triangular shape, and a second set of edges composed of triplets of horizontal or vertical collinear neighboring vertices.

13. The method according to claim 12, wherein the energy target function to minimize is computed as a sum of two third order terms, a first data term computed using said triplets of neighboring vertices of triangular shape and a second regularization term computed over the set of triplets of horizontal or vertical collinear neighboring vertices.

14. The method according to claim 13, wherein the second regularization term is computed as a weighted sum of two parts expressed as:

$$R_{ijk}(l_i,l_j,l_k)=(1-\gamma)R_{ijk}^A(l_i,l_j,l_k)+\gamma R_{ijk}^B(l_i,l_j,l_k)$$

where $\gamma$ is a weighting factor, comprised between 0 and 1, used to calibrate the regularization term, $l_i,l_j,l_k$ are respective three dimensional labels.

15. The method according to claim 12, wherein the global energy criterion is minimized by mapping the optimization problem to a factor graph and by applying dual decomposition algorithm.

16. The method of claim 1, wherein the obtaining of a set of displaced control points comprises a master-slave architecture:
communicating to each slave a rigid transformation, each slave generating a plane slice from the target volume corresponding to said rigid transformation,
obtaining an in-plane deformation transformation that minimizes a local energy criterion computed between the source image and the extracted plane slice, and
memorizing an associated local energy term that minimizes the local energy.

17. The method of claim 16, further comprising:
communicating the local energy term from each slave to the master,
obtaining an minimal energy value that minimizes the computed local energy terms and an associated in-plane deformation transformation,
memorizing the in-plane deformation transformation and rigid transformation minimizing
obtaining the in-plane transformation associated with the minimal energy value.

18. The method of claim 17, wherein the slaves carry out the step of obtaining an in-plane deformation transformation substantially in parallel.

19. A non-transitory program storage device readable by a processing system, tangibly embodying a program of instructions executed by the processing system to perform method steps for elastic registration of a two-dimensional source digital image of an object of interest with a slice of a three dimensional target volume of the object of interest, the method comprising defining a Markov Random Field framework comprising at least one undirected pairwise graph superimposed on a two-dimensional image domain comprising at least a set of regular vertices and at least a set of edges, defining at least a grid of control points, each control point corresponding to a vertex of the set of vertices, and a neighborhood system of edges associated with vertices,
said method further comprises:
defining a set of multi-dimensional labels of a discrete space to associate to each control point, wherein a spatially displaced control point is obtained by assigning a given label of the multi-dimensional labels to said control points, a control point displacement defining a transformation adapted to obtain a plane slice of the target volume and an in-plane deformation transformation of the source digital image,
obtaining a further set of labels defining a set of displaced control points, by minimizing an energy target function, the set of displaced control points defining a plane slice of the target volume that elastically matches the two-dimensional source digital image according to the energy function,
the energy target function being expressed as a sum of terms comprising:
at least one first order term computed as a sum, over the control points, of unary potentials depending on the multi-dimensional labels,
at least one second order term computed as a sum, over pairs of control points according to a second order neighborhood system, of pairwise potentials depending on pairs of multi-dimensional labels of two connected vertices, and
at least one higher order term, over higher order cliques of control points according to a higher order neighborhood system, of higher order potentials depending on a number of the multi-dimensional labels depending on the order of said cliques, and
obtaining said elastic registration.

* * * * *